Feb. 23, 1937.          C. ENGEL          2,072,071
PRACTICE KEYBOARD
Filed March 27, 1935
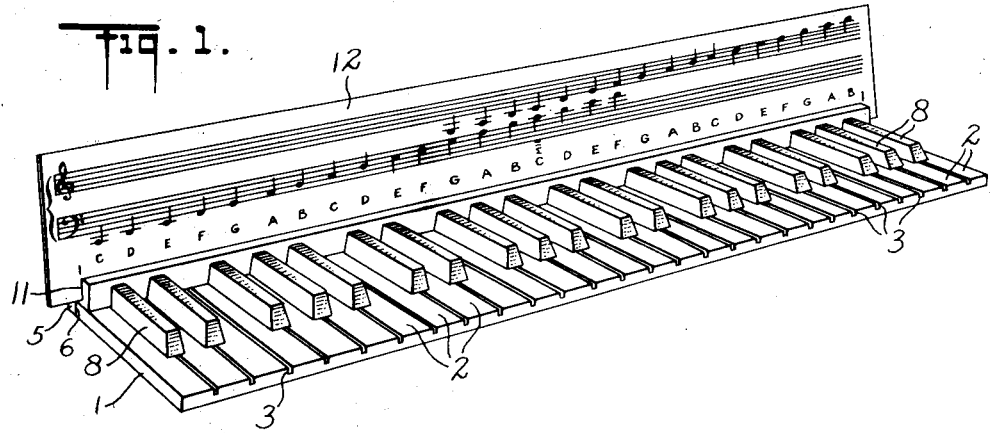
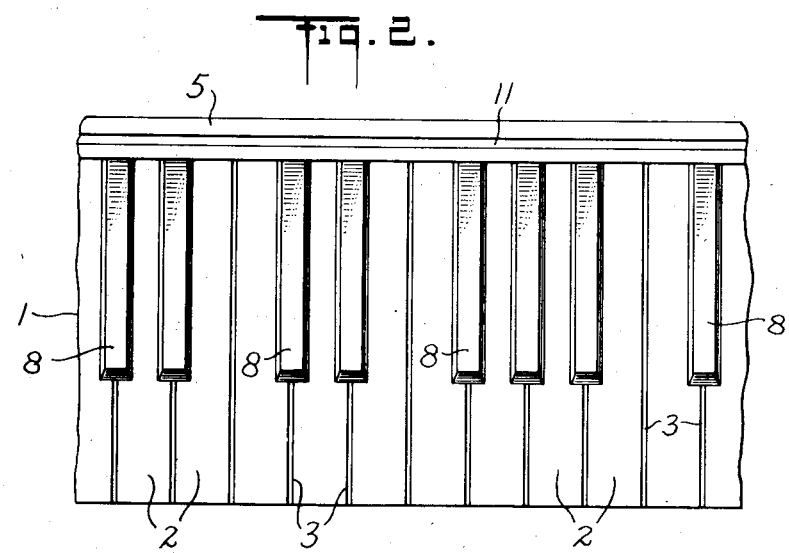
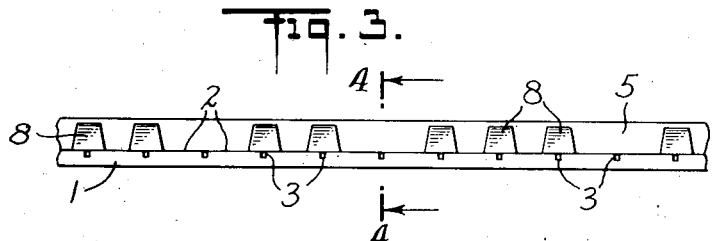
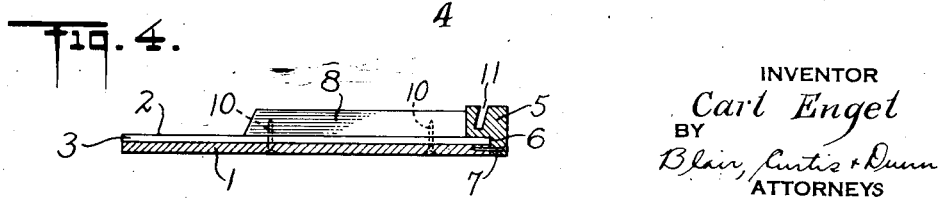
INVENTOR
Carl Engel
BY
Blair, Curtis & Dunn
ATTORNEYS Patented Feb. 23, 1937

2,072,071

UNITED STATES PATENT OFFICE 2,072,071

PRACTICE KEYBOARD

Carl Engel, New York, N. Y., assignor to G. Schirmer, Inc., New York, N. Y., a corporation of New York Application March 27, 1935, Serial No. 13,266

5 Claims. (Cl. 84—467)

This invention relates to a practice keyboard and more particularly to such a device for use in instructing students in the art of piano playing.

An object of the invention is to provide a light and durable practice keyboard of simple and inexpensive construction.

A further object is to provide an inexpensive and practical method of constructing a practice keyboard having flat white keys and elevated black keys, with the flat keys separated one from another by slots.

A further object is to provide simple and effective means for supporting musical instruction cards or charts in convenient relation to the keyboard.

Other objects will be in part obvious and in part pointed out hereinafter.

The invention accordingly consists in the features of construction, combination of elements, and arrangement of parts as will be exemplified in the structure to be hereinafter described and the scope of the application of which will be indicated in the following claims.

In the accompanying drawing, in which is shown a preferred embodiment of the invention, Fig. 1 is a perspective view showing the keyboard with a musical notation instruction card supported thereby;

Fig. 2 is a top plan view of a portion of the keyboard;

Fig. 3 is a front elevation of the said portion of the keyboard, and

Fig. 4 is a cross-section taken on line 4—4 of Fig. 3.

Similar reference characters refer to similar parts throughout the several views of the drawing.

Practice keyboards have been known heretofore. Some such keyboards have been provided with black keys raised above the surface of the white, as is customary with actual piano keyboards, and still others have been constructed with depressions located between the white keys to enable the student to determine the position of the keys by the sense of touch as well as by sight. These features are all included in the present keyboard, which differs from known keyboards of like nature by reason of its specific features of construction. Referring to the drawing it will be seen that the keyboard comprises a flat unitary member 1 of a length sufficient to provide the desired number of white keys 2, the width of the said member 1 being slightly greater than the effective length of the white keys. Preferably a thin board of hard wood is employed in the construction of the member 1, the upper surface of which is scored at regular intervals with parallel grooves 3 of predetermined depth, extending all the way across the said member from front to back. These grooves are spaced to provide keys of desired width and give both visual and touch indication of the positions of the respective keys.

In order to strengthen the member 1 and rigidly maintain it in a flat condition, there is provided a molding strip 5, rabbeted as at 6, and secured to the rear edge of the member 1 by means of nails. This molding, co-extensive in length with the member 1, prevents the latter from warping or bending transversely. Warping in the direction of the length of the member 1 is prevented by means of the black keys 8, which are properly positioned with respect to the member 1, and are secured thereto by means of nails 10. It will be, of course, understood that screws or even glue may advantageously be used in some instances for joining the members 5 and 8 to the flat key member 1.

The members 8 conform in shape to the black keys of a regular piano keyboard and both white and black keys may be proportioned in accordance with accepted keyboard standards. The length of the keyboard will be determined by the number of octaves or keys found most desirable for practice purposes.

The molding 5 serves also to define the length of the white keys and prevents the student's fingers from moving too far toward the rear edge of the keyboard. Molding 5 also provides efficient means for holding a music chart or card in proper position before the eyes of the student. The means employed is a slot 11 extending lengthwise of the member 5 and downward from the upper surface of said member to any desired depth. From bottom to top this slot slopes rearward relatively to the keyboard, so that a practice card standing therein will be supported in a plane substantially normal to the student's line of vision, thus facilitating easy reading of the musical notation appearing on the card. The whole keyboard is preferably manufactured from hard close-grained wood, but other materials such as a suitable composition, or even cardboard may be employed. In process of manufacture, the locations of the saw cuts 3 and black keys 8 may be determined by the use of a jig and the slot 11 may be formed by holding the molding member at the desired angle and running a circular saw the full length thereof. The flat members 1 and molding members 8 are preferably first produced in board or other standard lengths, and then cut in shorter lengths as required. The several parts of the keyboard may be appropriately painted or enameled prior to assembly, the coating of the members 1 and 5 being white; that of the members 8 black.

In Fig. 1, 12 represents a chart adapted for use with the present keyboard. This chart, made of stiff cardboard, has printed upon its surface a pair of bracketed staves having respectively the treble and bass clef designations. In relation to these staves is shown an arrangement of notes representing the key of C major ascending in four octaves, with the notes having the same spacing as the keys of the practice keyboard. In use, this chart is inserted in the slot 11, as shown, thus insuring the convenient positioning of the chart in normal relation to the line of vision of the student. It will be noted that the chart places middle C in the center opposite the middle C of the practice keyboard; and correspondingly each note of the four diatonic octaves occupies a position in substantial alignment with the appropriate key of the keyboard. Thus this combination of chart and keyboard is of great benefit to beginners.

It will be understood that other charts may be substituted for the C major chart disclosed, and where charts of the chromatic or harmonic scales are used the notes representing sharps and flats may conveniently be placed in substantial alignment with the appropriate black keys of the keyboard.

It will be seen that there is provided a construction of an essentially practical nature in which the several objects of this invention are attained.

As many possible embodiments may be made of the above invention without departing from the scope thereof, it is to be understood that all matter herein set forth or shown in the accompanying drawing is to be interpreted as illustrative and not in a limiting sense.

I claim:

1. A practice keyboard comprising, in combination, a long flat member having keys outlined thereon by a plurality of transversely extending scores cut in the surface thereof, a molding strip formed to engage the rear edge and a portion of the upper surface of said member and secured along the rear edge thereof, and a plurality of other keys in the form of blocks disposed in appropriate relation to said first keys and secured upon said flat member with an end of each block in substantial contact with the surface of said molding strip.

2. A practice keyboard comprising, in combination, a long flat member having keys outlined thereon by a plurality of transversely extending scores cut in the surface thereof, a molding strip secured to said member along the rear edge thereof, and a plurality of other keys in the form of blocks disposed in appropriate relation to said first keys and secured upon said flat member with an end of each block in substantial contact with the surface of said molding strip, said molding strip being formed with a slot adapted to support a music chart in convenient relation to the keyboard.

3. In a practice keyboard, in combination, a long flat board having the white keys of a piano keyboard outlined thereon by scoring the upper surface of the board with transverse saw cuts, a plurality of black key members disposed in appropriate relation to said white keys and fastened to said board, and means secured along the rear edge of said board as a strengthening member and slotted to provide support for charts of musical notation.

4. In a practice keyboard, in combination, a long flat member having the white keys of a piano keyboard outlined thereon, a plurality of other members secured to said member in appropriate relation to said white keys to simulate the raised black keys of a piano, and a rigid binding strip secured along the edge of said flat member rearwardly of said other members and provided with a backward sloping slot for supporting practice charts.

5. A practice keyboard comprising, in combination, a long flat member having upon its upper surface a representation of the black and white keys of a piano keyboard, and means for supporting a music chart in convenient relation to said keyboard comprising a molding strip slotted to receive an edge of such chart and secured to said flat member at the rear edge thereof.

CARL ENGEL.